United States Patent [19]

Shinomiya et al.

[11] Patent Number: 5,347,381
[45] Date of Patent: Sep. 13, 1994

[54] FERROELECTRIC LIQUID CRYSTAL DISPLAY DEVICE WITH MOLECULES BETWEEN HAIRPIN AND LIGHTNING DEFECTS FOLLOWING THE LIGHTNING DEFECTS

[75] Inventors: Tokihiko Shinomiya, Nara; Tsugiko Taniguchi, Kitakatsuragi; Tomoaki Kuratate, Nara; Kenichi Nakagawa, Fujinomiya, all of Japan

[73] Assignee: Sharp Kabushiki Kaisha, Osaka, Japan

[21] Appl. No.: 823,857

[22] Filed: Jan. 22, 1992

[30] Foreign Application Priority Data

Jan. 25, 1991 [JP] Japan .................................. 3-007879
Jan. 31, 1991 [JP] Japan .................................. 3-032395

[51] Int. Cl.$^5$ ...................... G02F 1/1337; G02F 1/13
[52] U.S. Cl. ...................................... 359/78; 359/100
[58] Field of Search ................................ 359/100, 78

[56] References Cited

U.S. PATENT DOCUMENTS

| | | | |
|---|---|---|---|
| 4,775,225 | 10/1988 | Tsuboyama et al. | 359/100 |
| 4,932,758 | 6/1990 | Hanyu et al. | 359/100 |
| 5,005,953 | 4/1991 | Kawagishi | 359/100 |
| 5,046,822 | 9/1991 | Matsuda et al. | 359/100 |
| 5,124,827 | 6/1992 | Davey | 359/100 |
| 5,138,473 | 8/1992 | Dijon et al. | 359/100 |
| 5,151,804 | 9/1992 | Verhulst et al. | 359/100 |
| 5,164,852 | 11/1992 | Konuma | 359/100 |
| 5,182,662 | 1/1993 | Mihara | 359/100 |
| 5,189,536 | 2/1993 | Hanyu et al. | 359/100 |
| 5,200,848 | 4/1993 | Hanyu et al. | 359/100 |
| 5,204,766 | 4/1993 | Tariguchi et al. | 359/100 |

FOREIGN PATENT DOCUMENTS

| | | |
|---|---|---|
| 0307959 | 3/1989 | European Pat. Off. . |
| 0424944 | 5/1991 | European Pat. Off. . |
| 0444705A3 | 9/1991 | European Pat. Off. . |

OTHER PUBLICATIONS

Koden et al., "The States of Surface-Stabilized Ferroelectric Liquid Crystal With High-Pretilt Aligning Film", Japanese Journal of Applied Physics, vol. 30, No. 10B (Oct. 1991), pp. L1823-L1825.

Kanbe et al., "High Resolution, Large Area FLC Display With High Graphic Performance", Ferroelectrics, vol. 114, (1991), pp. 3-26.

*Primary Examiner*—Anita P. Gross
*Attorney, Agent, or Firm*—David G. Conlin; George W. Neuner

[57] ABSTRACT

A ferroelectric liquid crystal display device comprising upper and lower substrates arranged opposite each other, each provided with electrodes on their respective surface, an insulating film formed on the electrodes on each substrate, an orientation film formed on the insulating film and subjected to a uniaxial orientation treatment, the orientation film with the same orientation direction on each of the two substrates, a liquid crystal composition with a chiral smectic C phase injected between the two substrates, drive means for switching an optical axis of the liquid crystals in the liquid crystal composition by selectively applying a voltage to the electrodes, means for optically identifying the switching of the optical axis, in which when the drive means is operated, the liquid crystal composition can reverse its molecular direction near the substrate and show a chevron structure which bends in a dogleg shape as a layer structure when it shows the chiral smectic C phase wherein a bending direction of the dogleg shape is toward an inside of an area surrounded by a lightening defect produced by a direction of the uniaxial orientation treatment of the orientation film and a hairpin defect produced therebehind or an outside of an area surrounded by a hairpin defect produced by a direction of the uniaxial orientation treatment and a lightening defect produced therebehind, and a pretilt angle $\theta_p$ of the liquid crystal composition to the orientation film is between 8° and 35°.

4 Claims, 8 Drawing Sheets

• BLOT C₁U ORIENTATION
X BLOT C₁Tw ORIENTATION
■ BLOT C₂Tw ORIENTATION

FERROELECTRIC LIQUID CRYSTAL DISPLAY DEVICE WITH MOLECULES BETWEEN HAIRPIN AND LIGHTNING DEFECTS FOLLOWING THE LIGHTNING DEFECTS

BACKGROUND OF THE INVENTION

1. Field of the Invention

The present invention relates to a liquid crystal display device where a ferroelectric liquid crystal is employed.

2. Description of the Related Art

As a liquid crystal display device employed with a nematic liquid crystal, a typical prior art includes a twisted nematic (TN) type liquid crystal display device, and a supertwisted birefringence effect (SBE) type liquid crystal display device.

However, such a twisted nematic type liquid crystal display device has a drawback that a sufficient contrast cannot be achieved because a drive margin has become narrower as a driving mechanism is multiplexed. The supertwisted birefringence effect type liquid crystal display device with a large twisted angle, which is an improved TN type liquid crystal display device, has also drawbacks that a great capacity of display causes a reduction of a contrast and a reduction of response velocity.

Then, as an improvement over such conventional liquid crystal devices employed with a nematic liquid crystal, N. A. Clark and Lagerwall proposed in 1980 a liquid crystal display device employed with a chiral smectic-C liquid crystal, or a ferroelectric liquid crystal (see Japenese Unexamined Patent Publication 56-107216 and U.S. Pat. No. 4,367,924).

The liquid crystal display device is that which utilizes a rotation force for matching the spontaneous polarization of the ferroelectric liquid crystal for a polarity of the electric field, unlike the above-mentioned liquid crystal display device which utilizes dielectric anisotropy of liquid crystal molecules to use a electric field effect. Features of this type of liquid crystal device include bistable, memory storage, quick response, and so forth. Specifically, when the ferroelectric liquid crystal is injected into a cell with thinner cell gap, an interface affects the ferroelectric liquid crystal to untie its spiral structure, and eventually, the ferroelectric liquid crystal assumes bistable because both areas where liquid crystal molecules tilt by an angle $\theta$ related to a smectic layer normal line to be stable and areas where they tilt by $-\theta$ in the reverse direction to be stable exist mingled with one another. Applying voltage to the ferroelectric liquid crystal within the cell, the liquid crystal molecules and their respective direction of the spontaneous polarization can be completely uniform, and thus, switching a polarity of the applied voltage allows an orientation of the liquid crystal molecule to switch from one state to another, in other words, a switching operation can be provided.

With such a switching operation, birefringent light varies in the ferroelectric liquid crystal within the cell, and therefore, the cell sandwiched between two polarizers can control a light transmission. Even if the voltage application is interrupted, the orientation of the liquid crystal molecules is retained in state of voltage before the interruption of voltage application because of an orientation adjusting force of the interface, so that a memory effect can also be attained. As to a time required for the switching operation, since the spontaneous polarization of the liquid crystal and the electric field directly interact with each other, a quick response of a required time of 1/1000 or less can be obtained compared with the TN type liquid crystal display device, thereby the device becomes available for a quick display.

Then, by utilizing the feature of the ferroelectric liquid crystal such as a memory effect and quick response, attempts have been made to construct a high resolution liquid crystal display device with a large number of scanning lines in accordance with a multiplex driving system.

However, there were several disadvantages in the Clark-Lagerwall type liquid crystal display device. In its first model, it was presumed that the smectic-C phase has a layer structure named "bookshelf type" where layers lie vertical on a substrate as shown in FIG. 9. However, when a cell is created in accordance with a conventional orientation method such as rubbing and the like, the resultant switching phenomenon and optical characteristic are deviated from a prospective view a great deal, and it is observed that the practical switching operation is completely different from that in the proposed model.

As one of factors, the layer structure was analyzed using an X-ray small angle scattering method and it is found that the layer structure is that named "chevron" and having a dogleg shape [see Phys. Rev. Lett., 59, p. 2658 (1987) by T. P. Rieker, N. A. Clark et al.]. Another point different from the first model is reported that the cell assumes a twisted orientation where molecules are twisted in upper and lower substrates as well as a uniform orientation where the direction of the spontaneous polarization and liquid crystal molecules are oriented in a uniform direction [J. Phys. (France), 45, p. 143 (1984) by M. Glogarova and J. pavel].

Especially, a ferroelectric liquid crystal element having its orientation defined by rubbing has a strong adjusting force in its interface, and therefore, it is found that the element has a twisted orientation. With such an orientation, in general, no effective difference in optical molecule axis in switching between two states cannot be observed, and it is found that no high contrast characteristic can obtained. To eliminate such drawbacks, there have been presented several systems to attain a layer structure model first proposed by Clark et al., and one of them is reported that the model is created by SiO slanting vacuum evaporation, where with addition of a relatively high pre-tilt to a substrate interface, a layer structure having a tilt is attained without bends of layers.

As a second method, technology is proposed in which a layer structure is changed into a bookshelf structure by applying an alternating electric field of greater voltage to a cell with a bending structure [12th Liquid Crystal Discussion (in Nagoya) 1F16 (1986) by Satoh et al.], and according to the reports, both of the above two methods attained a high contrast characteristic. However, the above-mentioned slanting vacuum evaporation has a great problem in a stage of production that a technology of keeping a uniform deposition angle is not so simple and that the procedure includes a process performed under near vacuum. Moreover, as to a method of applying an electric field, it is difficult to uniformly change the layer structure, and many of preparation cells change back to chevron structure with time, and in other words, the method still stays in an experimental stage.

Accordingly, it is an object of the present invention to provide a liquid crystal display device of high contrast property despite its chevron structure.

SUMMARY OF THE INVENTION

The present invention provides a ferroelectric liquid crystal display device comprising:
- upper and lower substrates arranged opposite to each other, each being provided with electrodes on their respective surface,
- an insulating film formed on the electrodes on each of the substrates,
- an orientation film formed on the insulating film and subjected to a uniaxial orientation treatment, the orientation film with the same orientation direction on each of the two substrates being oppositely arranged,
- a liquid crystal composition with a chiral smectic C phase injected between the two substrates,
- drive means for switching an optical axis of the liquid crystals in the liquid crystal composition by selectively applying a voltage to the electrodes,
- means for optically identifying the switching of the optical axis, in which when the drive means is operated, the liquid crystal composition can reverse its molecular direction near the substrate and show a chevron structure which bends in a dogleg shape as a layer structure when it shows the chiral smectic C phase wherein a bending direction of the dogleg shape is toward an inside of an area surrounded by a lightening defect produced by a direction of the uniaxial orientation treatment of the orientation film and a hairpin defect produced therebehind or an outside of an area surrounded by a hairpin defect produced by a direction of the uniaxial orientation treatment and a lightening defect produced therebehind, and a pretilt angle $\theta_p$ of the liquid crystal composition to the orientation film is between 8° and 35°.

Preferably, the orientation film is formed by an organic polymer film, and is formed through the uniaxial orientation treatment by rubbing.

DESCRIPTION OF THE PREFERRED EMBODIMENTS

The present invention will be described in detail in conjunction with embodiments shown in the accompanying drawings. The present invention should not be limited to the description.

Figure 2:
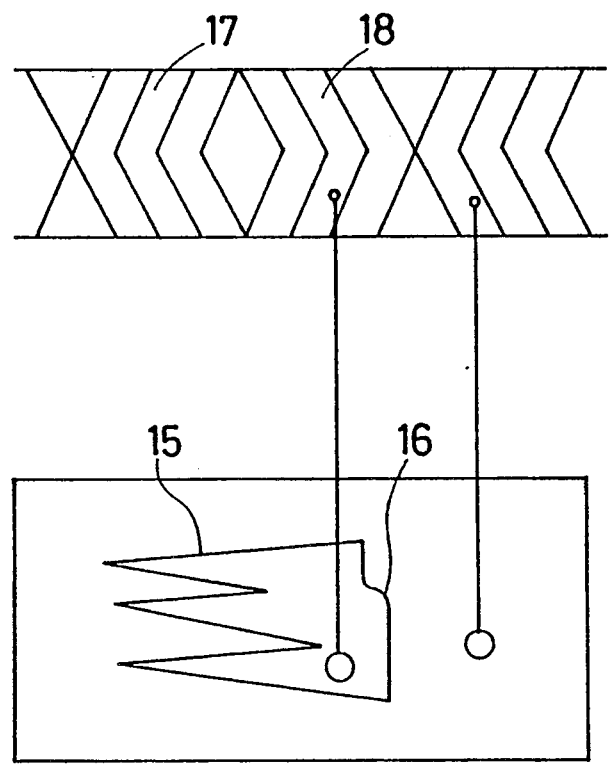
FIG. 2 is a schematic view showing a layer structure of a chiral smectic-C phase in the embodiment.

In general, it is known that a layer structure of a chiral smectic-C phase of a liquid crystal composition is a structure where layers bend in a dogleg shape. The cause of such a structure is that intervals among layers in a liquid crystal phase (generally, a smectic-A phase) on the side higher in temperature than the chiral smectic-C phase becomes smaller because liquid crystal molecules tilt when the liquid crystal phase varies to the chiral smectic-C phase while molecules near an interface of the substrate does not easily move to keep intervals among molecules in the phase on the side of higher temperature, and therefore, the layer intervals must be shortened without changing the molecule intervals in the interface, and the layers bend. However, the bends of the layers are caused in two directions (17, 18) as shown in FIG. 2, and this causes two different orientations. Then, orientation defects named zig-zag defects are caused in the position of the boundary between the layers bending in the different directions.

As shown in FIG. 2, two sorts of defects are found in the zig-zag defects depending upon the directions of the bends of the layers. Depending upon shapes, one of the defects, 15, is named lightning defects and the other 16 is named hairpin defects, and the direction of the bends of the layers can be assumed through the inspection of the shapes [Jpn. J. Appl. Phys., 28, p. 50 (1988)].

In the present invention, the bending structure is utilized, and the description about it will be discussed below. When the direction of the orientation treatment is the same in both the upper and lower substrates, there are two different orientation states depending upon whether the direction of the bends of the layers is the same as the direction of the orientation treatment or the former is reversed to the latter. The relations are shown in FIG. 3.

Figure 3:
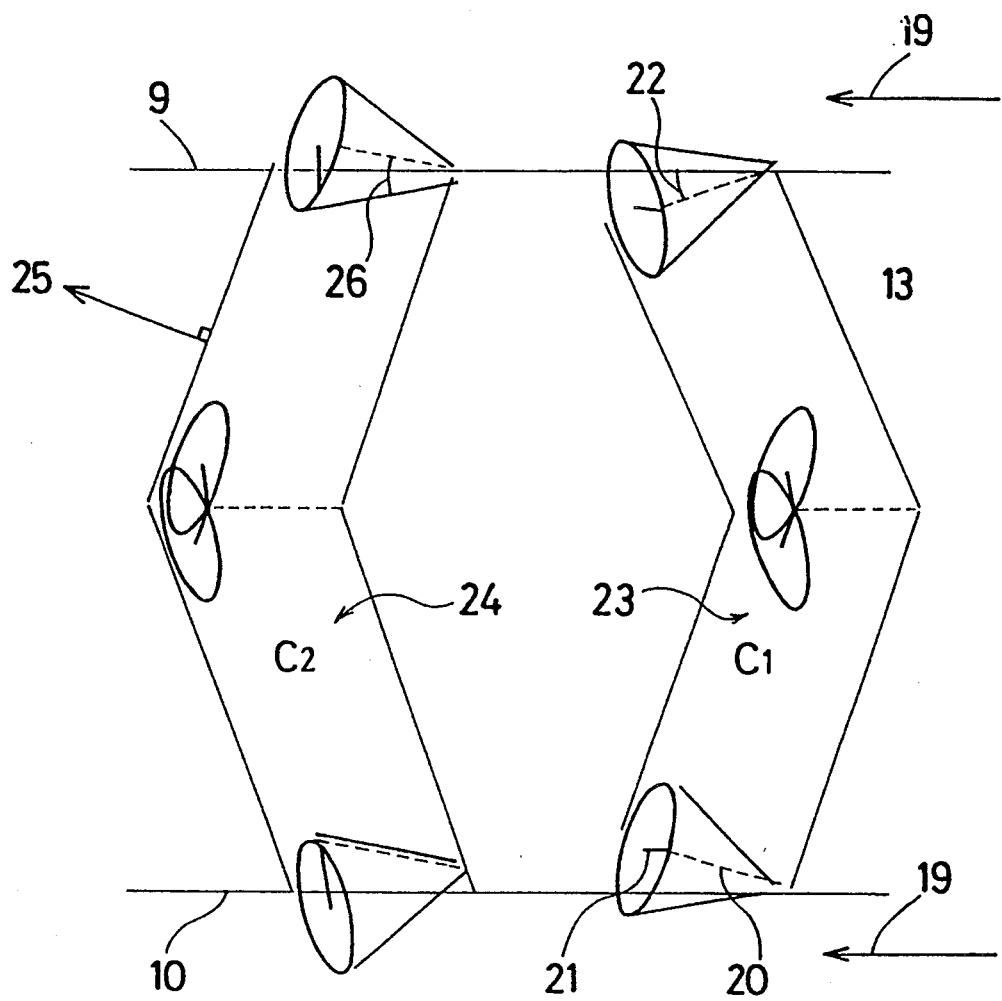
FIG. 3 is a schematic view showing C1 orientation and C2 orientation in the embodiment.

Circular cones shown in FIG. 3 represent orbits along which liquid crystal molecules move in switching, where liquid crystal tilts by tilt angle 26 related to a layer normal line 25. Arrow 19 denotes a direction of the rubbing. Regarding to the relations, as discussed in Japanese Unexamined Patent Publication 1-158415, a definition of a case where an axis of the rubbing and a direction of the bends of the layers are reversed to each other as shown in FIG. 3–23 is Chevron 1 (C1 orientation) while a definition of a case where the former and the latter are identical in direction as shown in FIG. 4–24 is Chevron 2 (C2 orientation). Like definitions designate the corresponding phenomena herein.

Figure 4:
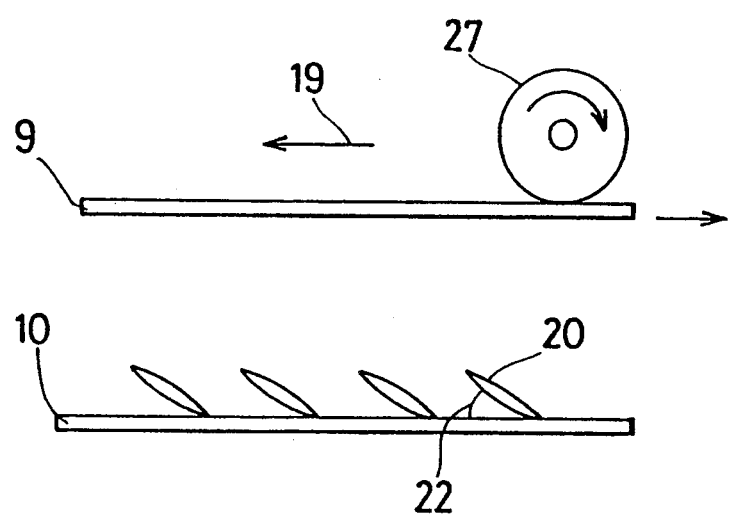
FIG. 4 is a diagram showing a rubbing treatment in the embodiment.
Figure 5:
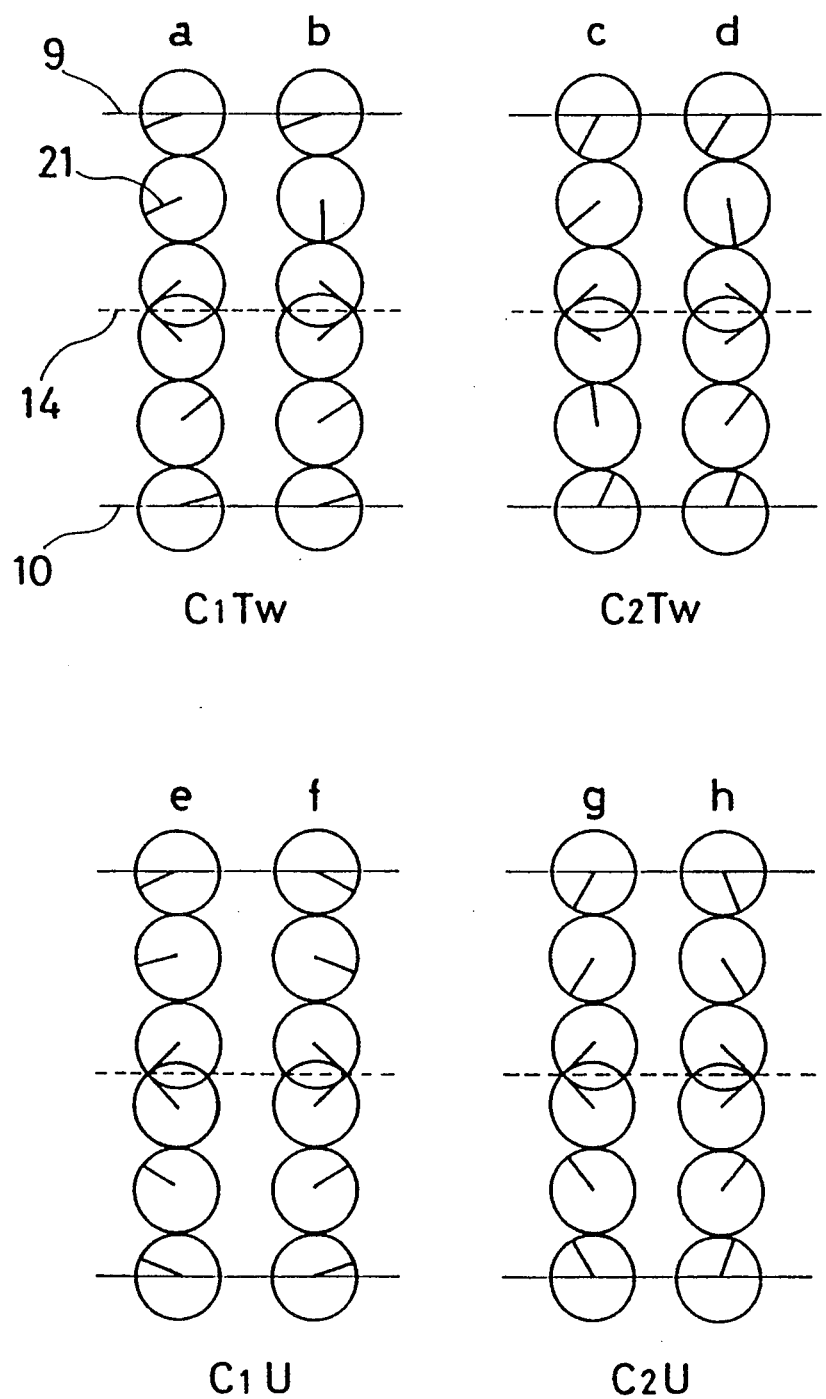
FIG. 5 is a diagram showing C-directors of C1 and C2 orientations in the embodiment.

The C1 and C2 orientations show almost equivalent orientation states when there is made no pre-tilt of liquid crystal molecules in the substrate interface. However, when the single orientation treatment such as the rubbing treatment is performed, a pre-tilt angle 22 of the liquid crystal molecules is caused in the direction as shown in FIG. 4. As the pre-tilt is made greater, a difference in orientation state of the liquid crystal molecules between the C1 and C2 becomes gradually more conspicuous, and with the pre-tilt angle of 2° or more, the difference in orientation state becomes sufficiently conspicuous. The difference in orientation state is shown in FIG. 5.

Referring to FIGS. 5a, 5b and FIGS. 5c, 5d, states of molecules in memory states of the C1 and C2 orientations when the molecules in the substrate interface cannot easily move are illustrated with a presentation of C directors. The liquid crystal molecules are in a twisted state in the upper and lower substrates, and therefore, the C1 orientation in this case is defined as Chevron 1 Twist (C1Tw) orientation while the C2 orientation is defined as Chevron 2 Twist (C2Tw) orientation. The switching when an electric field is applied arises between "a" and "b", and "c" and "d". At this time, the switching in memory state arises only in a joint portion 25 14 of the chevron structure.

An arrangement of the molecules in the interfaces of the upper and lower substrates will be discussed referring to FIG. 3. An n director 20 makes a great twist in the C1Tw orientation while it makes a small twist in the C2Tw orientation. Assuming now that deflecting plates are disposed orthogonal to each other in upper and lower portions in a cell and the cell is rotated within them, there is no space for extinction in the C1Tw orientation while there is a space for extinction in the C2Tw orientation, and the C2Tw orientation can attain a better contrast characteristic, producing a darker display, than the C1Tw orientation (see Japanese Unexamined Patent Publication 1-158415). Meanwhile, allowing for the case where the molecules near the interface can move more easily and the interface reversal is consequently caused, the situation varies.

Referring to FIGS. 5e, 5f and FIGS. 5g, 5h, situations of molecules in memory states of the C1 and C2 orientations when the interface reversal is caused are illustrated. The twist of the liquid crystal molecules in the upper and lower substrates is untied, and therefore, the molecules are uniformly aligned. A definition of the C1 orientation in this case is Chevron 1 Uniform (C1U) orientation while a definition of the C2 orientation is Chevron 2 uniform (C2U) orientation. The switching when an electric field is applied arises between "e" and "f", and "g" and "h", respectively. In the C1U orientation in this situation, the twist of the molecules in the upper and lower substrate of the two memory states is untied. Moreover, since an angle of an optical axis between two memory states (memory angle $\theta M$) becomes larger, extinction in orthogonal nicols can be performed. In addition to that, when the optical axis is switched into the other memory state by setting a cell in an extinction point and applying voltage thereto, the optical axis angle moves a great deal, and therefore, a large light variation can be obtained. However, in the C2U orientation, even if the inversion of the molecules close to the interface is caused, a variation in the optical axis cannot be made a great deal between the first and second memory states as will be recognized in FIG. 5. Thus, it will be recognized that the C1U orientation brings about a higher contrast. Thus, with regard to the contrast characteristic, the following relations can be established:

Great Contrast                    Poor Contrast
        C1U > C2U ≧ C2Tw > C1Tw

While the C1U orientation is positively employed in this embodiment, especially in the case of the switching where the interface reversal such as a uniform orientation is utilized, the movement of the bulk of liquid crystal and the movement of the liquid crystal close to the interface are independent of each other; usually, a tendency is observed that the bulk of molecules can easily move while the molecules close to the interface do not easily move, and therefore, the switching with the interface reversal is liable to be very slow. However, it should be also possible that the switching of the inversion of the molecule in the substrate interface is performed a small voltage as possible and a narrow pulse width as possible depending upon the way of a control of the state of the interface.

Figure 6:
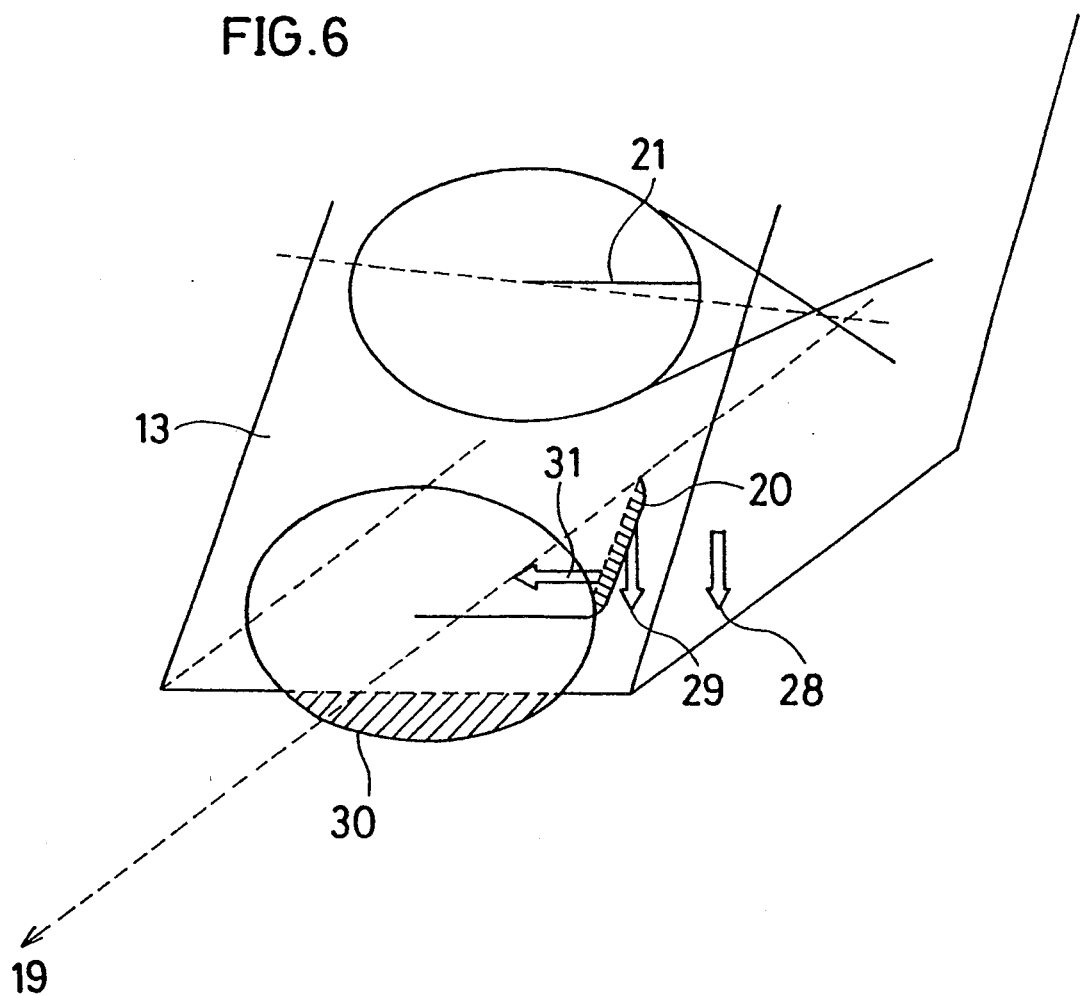
FIG. 6 is a schematic view showing liquid crystal molecules in an interface of a substrate in the embodiment.

FIG. 6 is a schematic diagram showing the liquid crystal molecules close to the substrate interface. In general, the liquid crystal molecules likely move with a variation in volume as small as possible against an electric field from the outside, and it is assumed that the molecules move on a cone-shaped orbit as shown in FIG. 6 to perform the switching without changing intervals of layers of the smectic-C. Thus, the molecules cannot make a perfect cone-shaped orbit because of an obstacle of the substrates near the substrate interfaces. Then, in the interface, a spontaneous polarization which the liquid crystal itself has is attracted or repulsed toward or from the substrate by an electric field 28 generated by a contact of the liquid crystal with the orientation film.

Figure 7:
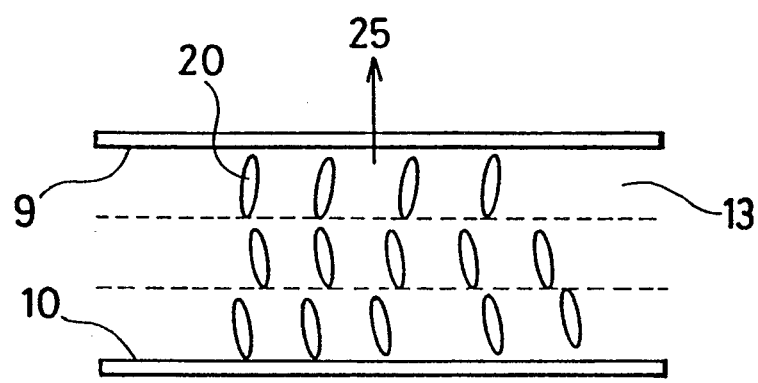
FIG. 7 is a schematic view showing a layer structure of a chiral smectic-C phase and an arrangement of the liquid crystal molecules in the embodiment.

The liquid crystal molecules is laid under a constraint 31 of an anchor ring. Although the relation in force between them has not been clarified yet, the contact electric field and the constraint of the anchor ring can be reduced and the molecules take the cone-shaped orbit by keeping the molecules away from the substrates to cause the interface reversal more easily. Thus, it is found that the pre-tilt angle may be increased to cause the interface reversal phenomenon more easily. Experimentally, the reversal in the interface cannot be so often observed until the pre-tilt angle $\theta_P$ reaches 8° and above, but as the pre-tilt angle becomes larger, a switching time necessary for the interface reversal becomes shorter. However, as shown in FIG. 7, when the pre-tilt angle $\theta_P$ attains 35° and above, the direction of the normal line of the smectic layers comes to be perpendicular to the substrates, and accordingly, the orientation turns to the state where an ordinary switching cannot be performed. Thus, it is found that such a large pre-tilt angle is not good.

In the present invention, various liquid crystals are employed to find a corn angle ($2\theta$) in the C1U orientation and a varied angle (memory angle $\theta_M$) of the optical axis in the memory state, and it is recognized that they have relations with the pre-tilt angle $\theta_P$ made by the substrate and the liquid crystal molecules. Specifically, $\theta_M/2\theta \approx 0.5$ is satisfied when $\theta_P < \theta$ while $\theta_M/2\theta = 1.0$ is satisfied when $\theta_P > \theta$, or $\theta_M/2\theta$ takes a value dispersed from 0.5 to 1.0 when $\theta_P \approx \theta$. Thus, selecting materials and the like so that the requirement $\theta_P \geq \theta$ may be satisfied, an effective variation in the optical axis in the memory state can be attained, and a high contrast characteristic can be obtained.

Now described is a way how to distinguish an orientation state from the other. As to the distinguishing of the C1 from the C2, the direction of the bends of the layers can be assumed in accordance with the shapes of the zig-zag defects developed from spacers and flaws within the cell. Specifically, there are two sorts of shapes of the defects: a lightning type and a hairpin tupe. Usually, those two defects are connected to each other and closed, and the directions of the bends of the layers are different between an inside area surrounded by the defects and the outside (see FIG. 2), and thereby the direction of the rubbing and the direction of the bends of the layers can be assumed. The direction of the rubbing corresponds to the direction of the pre-tilt having the relations as shown in FIG. 4.

As to a discrimination method whether it is a twist orientation or a uniform orientation, there are judgment criterion according to the following two points:

1. When a microscopic observation is made to the cell to which a chopping wave is being applied, a reversed domain may be observed. At this time, a domain reversal (called "ship-shaped domain") caused by the shift of an internal disclination developed in a joint of a chevron is caused indifferent whether the cell assumes a twist orientation or a uniform orientation. Then, if one or more other domain reversal is observed beside the above-mentioned reversal, the reversal is a reversal in the interface, and it can be judged that the cell have experienced a uniform state in the switching.

2. This is the case where the optical axis angle between the two stable states (states where no voltage is applied) in the memory state is 40% or over of an angle of a displacement of the optical axis which is found by applying a sufficient electric field (approximately ±10 V) to the cell. In an ordinary twist orientation, a value at about 30% level can be barely attained.

EXAMPLE 1

Figure 1:
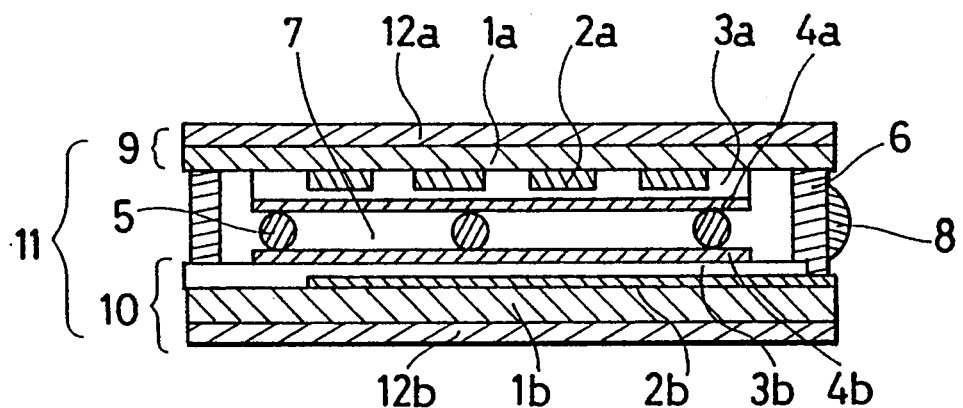
FIG. 1 is a sectional view showing a liquid crystal display device of an embodiment according to the present invention.

FIG. 1 is a diagram showing a liquid crystal display device according to the present invention in section. Referring to FIG. 1, a plurality of transparent electrodes 2a having 300 to 5000 Å, or preferably, 1000 to 3000 Å thickness are disposed in stripes in parallel with each other on a glass substrate 1a. An electrode protecting film 3a of $SiO_2$ having 300 to 5000 Å, or preferably 500 to 2000 Å thickness is formed by spattering upon them, and an orientation film 4a is formed further thereon by a spin coater. After that, a uniaxial orientation treatment through the rubbing where cloth of a rayon family is employed is practiced to form a substrate 9. On the other hand, in the similar conditions, a plurality of transparent electrodes 2b are disposed in stripes in parallel with each other on the other glass substrate 1b, and an orientation film 4b is formed through an electrode protecting film 3b upon them. After that, the uniaxial orientation treatment is practiced through the rubbing to form a substrate 10.

Then, the substrates 9 and 10 are stuck to each other by a seal 6 of epoxy resin via silica spacers 5 which makes intervals of 1.5 μm therebetween so that the respective orientation films 4a and 4b may be opposite to each other, the transparent electrodes 2a and 2b may be orthogonal to each other, and the rubbings may be almost identical in direction. A liquid crystal 7 (CS-1014 manufactured by Chisso Petrochemical Co., Ltd.) having a chiral smectic-C phase is heated and injected from an inlet between the substrates 9 and 10 according to a vacuum injection method, and thereafter the inlet is sealed by a UV hardened resin 8 to make a liquid crystal cell 11.

Furthermore, deflecting plates 12a and 12b are disposed orthogonal to a deflection axis in the top and bottom of the cell, and a deflection axis of one of the deflecting plates is almost aligned to one of optical axes of the liquid crystal of the cell to complete a liquid crystal display device. The orientation films 4a and 4b in the above mentioned embodiment includes nine kinds of orientation films having different values of the pre-tilt angle, thereby nine kinds of cells A to I are made. Another cell having about 20 μm thickness is made where the configuration is similar to the above and the directions of the rubbings are reversed but parallel to each other, and E-8 liquid crystal manufactured by Merk Company is injected. Then, the pre-tilt angle of liquid crystal molecules in the nematic phase is measured by a magnetic field capacity method. The liquid crystal different from the liquid crystal injected in the above is used because the liquid crystal having a chiral smectic-C phase has its molecules twisted in a cholesteric phase, and therefore, an accurate tilt angle cannot be measured.

Although it is generally known that a pre-tilt angle somewhat depends upon a liquid crystal material, most materials except special materials such as perfluoroalkyl develop pre-tilt angles with a dispersion of about 1 to 2, and hence, the substitute liquid crystal is used for the measurement. Table 1 below lists orientation films and respective measurements of pre-tilt angles.

TABLE 1

| Cell No. | Orientation Films (Company) | Pre-tilt Angle |
| --- | --- | --- |
| A | PSI-7355 (Chisso) | 6 |
| B | PSI-7356 (Chisso) | 6.5 |
| C | PSI-7354 (Chisso) | 8 |
| D | LQ-1800 (Hitachi Chemical Ind.) | 8 |
| E | PSI-A-005 (Chisso) | 13 |
| F | PSI-A-006 (Chisso) | 13 |
| G | PSI-A-009 (Chisso) | 15 |
| H | PSI-X-S130 (Chisso) | 17 |
| I | RN-715 (Nissann Chemical) | 35 |

Chisso: Chisso Petrochemical Co., Ltd.

Figure 8:
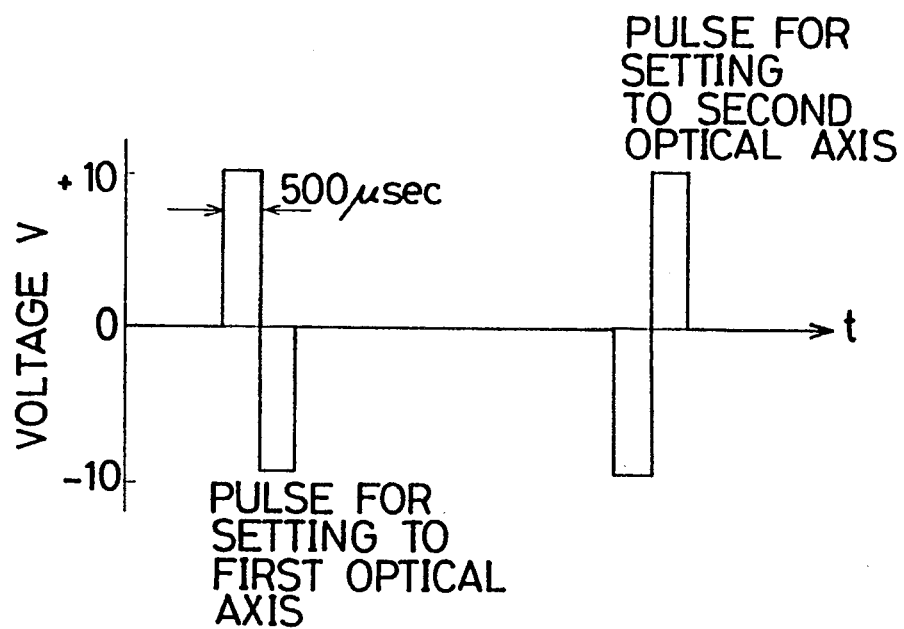
FIG. 8 is a wave form diagram showing a bipolar pulse application state in the embodiment.
Figure 9:
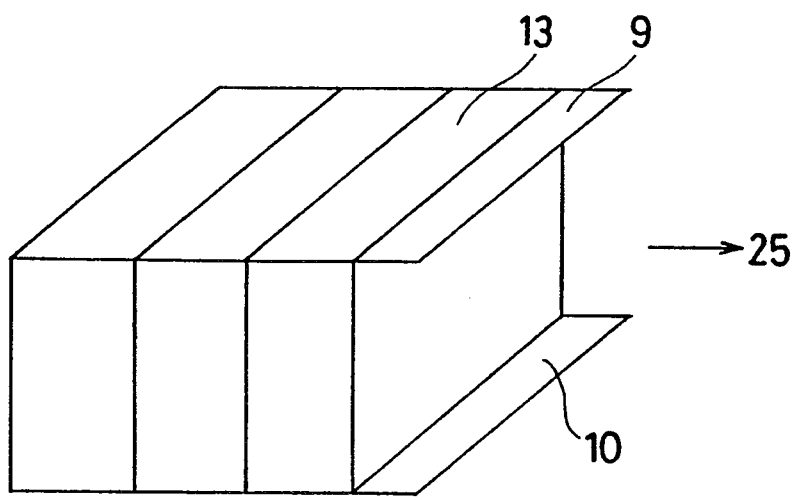
FIG. 9 is a schematic view showing a layer structure of a smectic-C phase in a conventional embodiment.
Figure 10:
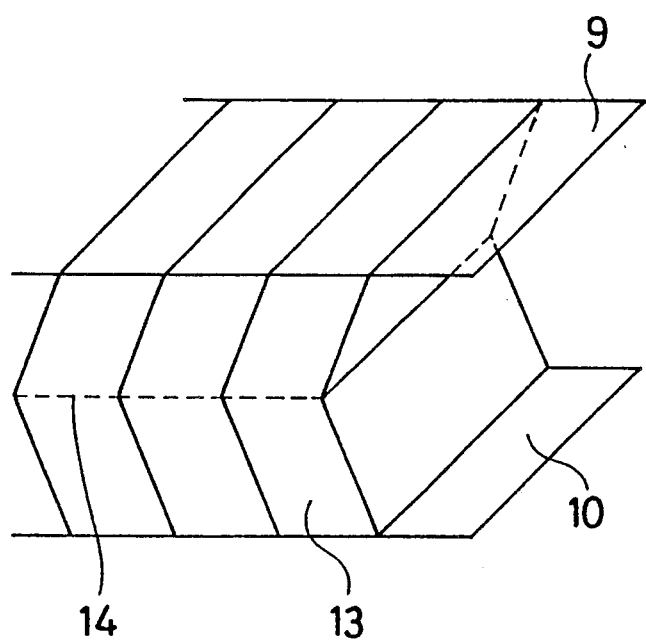
FIG. 10 is a schematic view showing another layer structure of a smectic-C phase in the conventional embodiment.

Then, a bipolar pulse of ±10 V 500 μsec as shown in FIG. 8 (the switching pulse has a pulse width approximately twice as fast as the switching speed (about 250 μsec) between the twist orientations, measured in the cell without an interface reversal) is applied to the cell to switch an optical axis so as to find in an area assuming the C1 orientation whether the switching arises between the uniform orientations. Table 2 below shows rates of the area assuming the C1U orientation and the results of the switching.

TABLE 2

| | | |
| --- | --- | --- |
| A | X | 10% |
| B | X | 10% |
| C | X | 30% |
| D | Δ | 35% |
| E | O | 90% |
| F | O | 90% |
| G | O | 95% or above |
| H | O | 95% or above |
| I | X | 0% (at 25° C.) |

O The switching between the uniform orientations can be performed.
Δ Partially can be performed.
X The switching between the uniform orientations cannot be performed.

As can be seen in Table 1, as the pre-tilt angle becomes large, especially as it reaches 8° and above, the switching can be performed. In a cell I where the pre-tilt angle attains 35° or above, the normal line of the smectic layer lies orthogonal to the substrates, the cell 1 assumes no C1 and C2 orientations at all and loses the switching function. When the pre-tilt is small, the cell easily assumes the C1Tw or C2 orientation, and it is recognized a great pre-tilt angle is effective in creating the C1U orientation.

In this way, the cells E, F, G and H can attain the C1U orientation over almost all the surface and are available for a quick switching. Moreover, two optical axes angles are made larger, and the contrast ratio between the two memory states can attain 40 or over.

EXAMPLE 2

A liquid crystal display device is manufactured in a configuration similar to the embodiment 1 (see FIG. 1). Ester mixed liquid crystals and pyrimidine mixed liquid crystals, which have a chiral smectic-C phase shown in Table 3, are mixed at rates shown in Table 4 into liquid crystal composites (2A to 2N in Table 4). As with the liquid crystals 2A to 2N, LC1 to BDH859 are mixed at rates in Table 4 (Table 4 reads 100 wt % from LC1 to BDH859), and thereafter, CH to TCNQ are added to the mixtures (amounts of the additive CH to TCNQ are represented in the rates to the total weight of the liquid crystals 2A to 2N).

These liquid crystal composites, while being heated, are injected from an inlet between the substrates 9 and 10 by a vacuum injection method, and then, the inlet is sealed by acrylic family UV hardened resin 8 to make a liquid crystal cell 11. Tilt angles of the liquid crystal composites are shown in Table 5.

TABLE 3

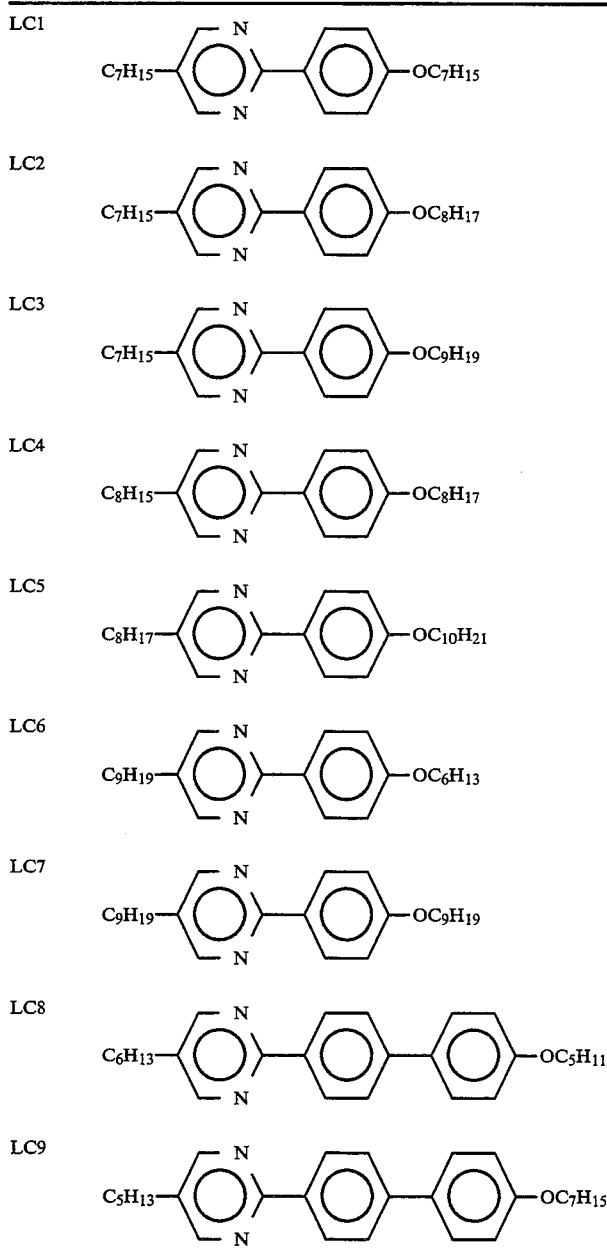

TABLE 3-continued
LC10 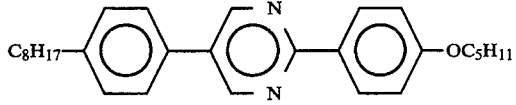
LC11 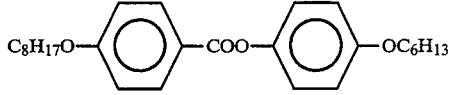
LC12 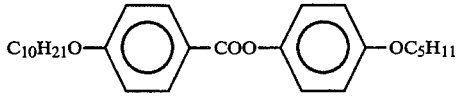
LC13 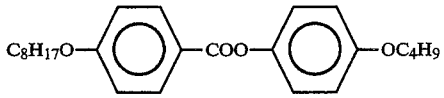
LC14 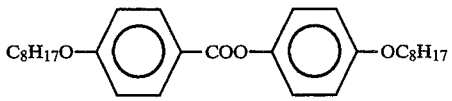
LC15 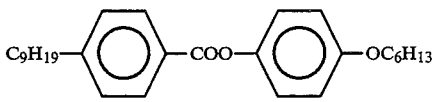
LC16 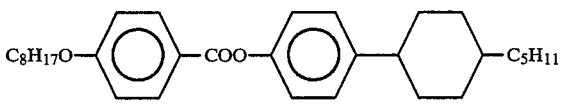
LC17 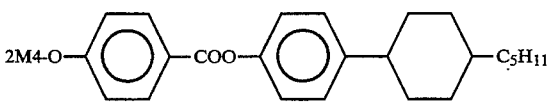
LC18 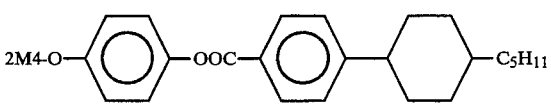        2M4: 2METHYLBUTHYL
LC19 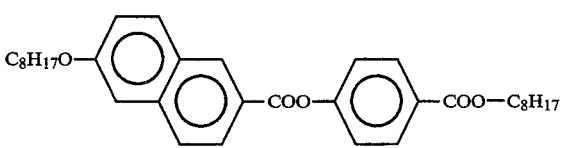
CH2 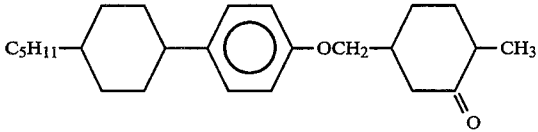
CH1 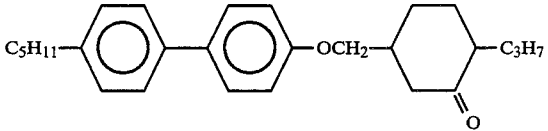
FA1 

TABLE 3-continued

| | |
|---|---|
| TCNQ | TETRACYANOQUINODIMETHANE |
| BDH859 | LIQUID CRYSTAL COMPOUNDS (PRODUCT OF BDH Co.) |

TABLE 4

| | 2A | 2B | 2C | 2D | 2E | 2F | 2G | 2H | 2I | 2J | 2K | 2L | 2M | Sheet 1 2N |
|---|---|---|---|---|---|---|---|---|---|---|---|---|---|---|
| LC 1 | | | | | | | | 10 | | | | | | |
| LC 2 | | | | | | | | 5 | | | | | | |
| LC 3 | | 15 | | 15 | | 15 | 17 | | | 15 | | | | 15 |
| LC 4 | | 15 | | 15 | | 15 | 11 | | | 15 | | | | 15 |
| LC 5 | | 25 | | 25 | | 25 | | | | 25 | | | | 25 |
| LC 6 | | 15 | | 15 | | 15 | 13 | | | 15 | | | | 15 |
| LC 7 | | | | | | | | 44 | | | | | | |
| LC 8 | | 15 | | 15 | | 15 | | | | 15 | | | | 15 |
| LC 9 | | 10 | | 10 | | 10 | | | | 10 | | | | 10 |
| LC 10 | | | 5 | | 5 | | 5 | | | | 5 | | | 5 |
| LC 11 | | 15.3 | | 15.3 | | | | | | 15.3 | | | 15.3 | |
| LC 12 | | 9.9 | | 9.9 | | | | | | 9.9 | | | 9.9 | |
| LC 13 | | 15.1 | | 15.1 | | | | | | 15.1 | | | 15.1 | |
| LC 14 | | 9.8 | | 9.8 | | | | | | 9.8 | | | 9.8 | |
| LC 15 | | 1.49 | | 1.49 | | | | | | 1.49 | | | 1.49 | |
| LC 16 | | 10 | | 10 | | | | | | 10 | | | 10 | |
| LC 17 | | 9.8 | | 9.8 | | | | | | 9.8 | | | 9.8 | |
| LC 18 | | 7.7 | | 7.7 | | | | | | 7.7 | | | 7.7 | |
| LC 19 | | 7.5 | | 7.5 | | | | | | 7.5 | | | 7.5 | |
| BDH 859 | 100 | | | | 100 | | | | | | 100 | 100 | | |
| CH 1 | 2 | 0.2 | 0.2 | 2 | 2 | 0.2 | 0.2 | | 2 | 2 | 0.2 | 2 | 0.2 | 0.2 |
| CH 2 | | | | | | | | 2 | | | | | | |
| FA 1 | | | 0.09 | 0.09 | | 0.09 | | | | 0.09 | | 0.09 | 0.09 | |
| TCNQ | | 0.47 | | 0.47 | | 0.48 | 0.51 | | | 0.47 | | | | |

(wt %)

TABLE 5

| Liquid Crystal | Tilt Angle $\theta$ | Main Components |
|---|---|---|
| 2A | 22.3° | Pyrimidine Mixed LC |
| 2B | 10.3° | Ester Mixed LC |
| 2C | 18.0° | Pyrimidine Mixed LC |
| 2D | 12.7° | Ester Mixed LC |
| 2E | 18.1° | Pyrimidine Mixed LC |
| 2F | 14.6° | Pyrimidine Mixed LC |
| 2G | 7.1° | Pyrimidine Mixed LC |
| 2H | 13.5° | Pyrimidine Mixed LC |
| 2I | 14.1° | Ester Mixed LC |
| 2J | 14.5° | Pyrimidine Mixed LC |
| 2K | 16.7° | Pyrimidine Mixed LC |
| 2L | 22.4° | Pyrimidine Mixed LC |
| 2M | 11.8° | Ester Mixed LC |
| 2N | 7.1° | Pyrimidine Mixed LC |

Moreover, the deflecting panels 12a and 12b are disposed almost orthogonal to a deflecting axis in the top and bottom cells, and a deflecting axis of one of the deflecting panels is almost aligned to an optical axis of one of the liquid crystals of the cell to complete a liquid crystal display device. As the liquid crystal 7, as mentioned hereinafter, liquid crystals shown in 2B, 2D, 2F and 2G in Table 5 are those which satisfy the relation of pre-tilt angle $\theta_P \geq$ tilt angle $\theta$, and are applied to the embodiments of the liquid crystal display device according to the present invention.

Figure 11:
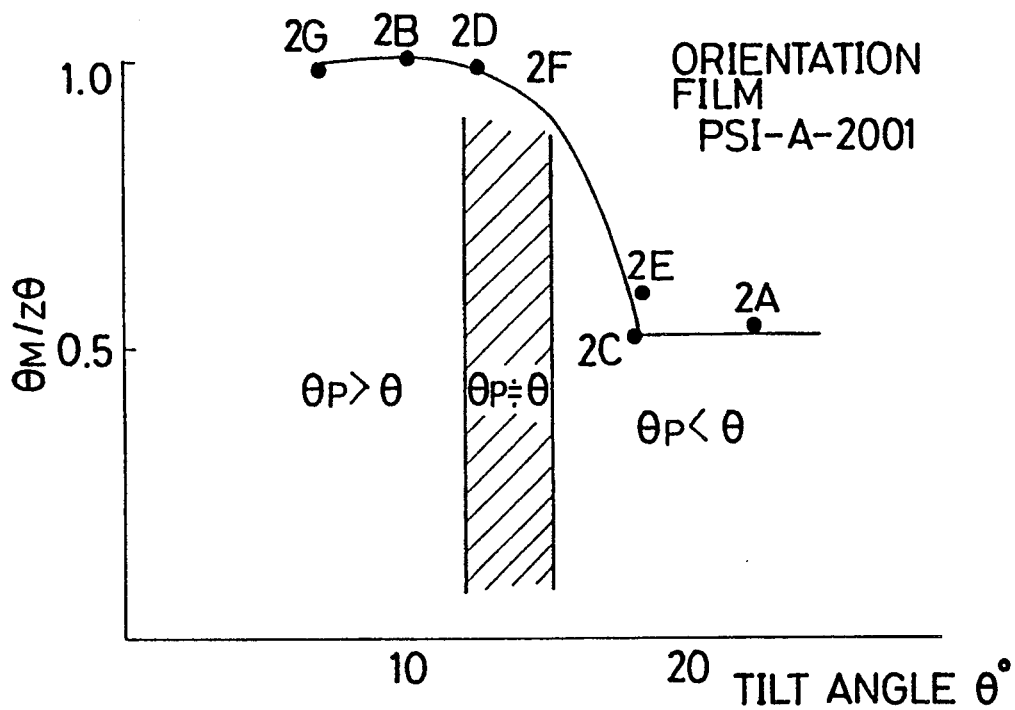
FIG. 11 is a graph showing relations between a rate of a memory angle $\theta_M$ to a tilt angle $\theta$ and the tilt angle $\theta$ in the embodiment of the liquid crystal display device according to the present invention and a comparison embodiment.

Another cell having about 20 μm thickness is made where the configuration is similar to the above and the directions of the rubbings are reversed but parallel to each other, and E-8 liquid crystal manufactured by Merk Company is injected. Then, the pre-tilt angle of liquid crystal molecules in the nematic phase is measured by a magnetic field capacity method. As a result, the pre-tilt angle $\theta_P$ is 12 to 15 in the orientation film PSI-A-2001. FIG. 11 is a graph in which the vertical axis shows a rate $\theta_M/2\theta$ of a liquid crystal cone angle $2\theta$ to a memory angle $\theta_M$ while the lateral axis shows the pre-tilt angle $\theta_P$, and those factors about the liquid crystals 2A to 2G are plotted.

As can be seen in FIG. 11, when the cell assumes the C1U orientation, a value of $\theta_P > 2\theta$ when $\theta_P > \theta$ with a boundary of $\theta_P \approx \theta$ equals almost 1.0, and an effective optical axis angle can be obtained. However, it will be found that a value of $\theta_M/2\theta$ when $\theta_P < \theta$ is usually equal to about 0.5. In other words, in the liquid crystals 2G and 2B, $\theta_P > \theta$ is satisfied and the memory angle $\theta_M$ corresponds to a value about twice as large as the tilt angle $\theta$, while in the liquid crystals 2D and 2F, $\theta_P = \theta$ is satisfied and the memory angle $\theta_M$ corresponds to a value about twice as large as the tilt angle $\theta$, and thus, in either case, a value close to the optical axis angle (maximum optical axis angle) between the two states accomplished during the optimum switching operation can be obtained. On the contrary, in the liquid crystals 2A, 2C and 2E, $\theta_P < \theta$ is satisfied, the memory angle $\theta_M$ merely takes a value almost equal to the tilt angle $\theta$, and thus, merely a value close to almost the half of the optical axis angle between the two states accomplished during the optimum switching operation can be obtained.

Then, the case of $\theta_p << \theta$ will be described. Of the above mentioned components, PSI-XS-014 (polyimide amide) manufactured by Chisso Petrochemical Co., Ltd. is substituted for the orientation films 4a and 4b, and is similarly processed into a cell. Then, a plurality of liquid crystals (2I to 2N in Table 4) different in tilt angle are injected into the cell to make a liquid crystal cell.

Figure 12:
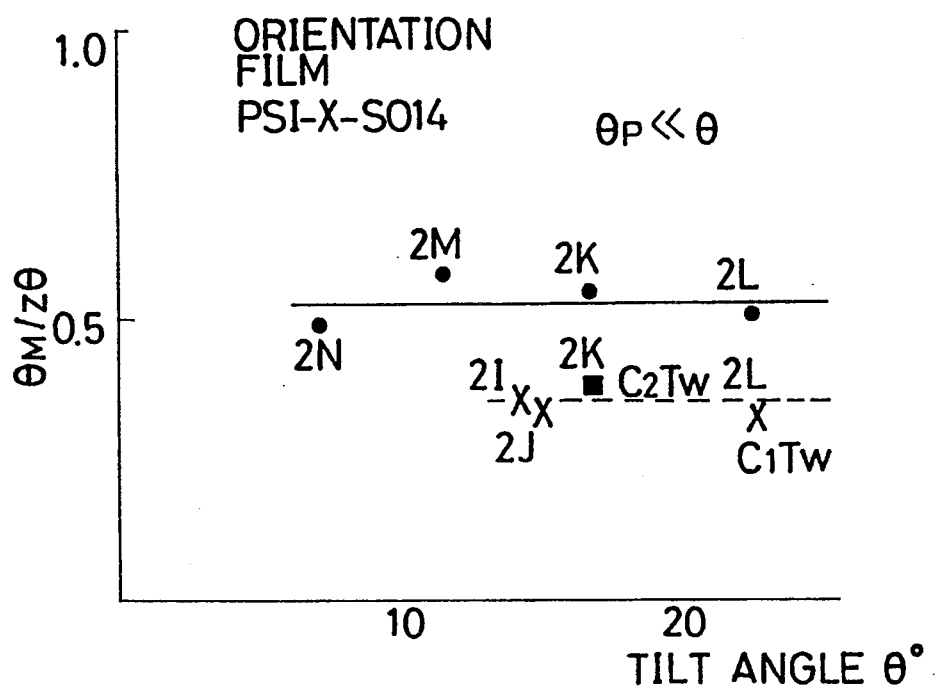
FIG. 12 is a graph showing relations between a rate of a memory angle $\theta_M$ to a tilt angle $\theta$ and the tilt angle $\theta$ in another embodiment of the liquid crystal display device.

Another cell having about 20 μm thickness is made where the configuration is similar to the above and the directions of the rubbings are reversed but parallel to each other, and E-8 liquid crystal manufactured by Merk Company is injected. Then, the pre-tilt angle of liquid crystal molecules in the nematic phase is measured by a magnetic field capacity method. As a result, the pre-tilt angle $\theta_p$ is 1° to 2° in the orientation film PSI-X-SO141. FIG. 12 is a graph in which the vertical axis shows a rate $\theta_M/2\theta$ of a liquid crystal cone angle $2\theta$ to a memory angle $\theta_M$ in the case of the orientation film of PSI-X-S014 while the lateral axis shows the pre-tilt angle $\theta_p$, and those factors about the liquid crystals 2I to 2N are plotted. In FIG. 12, the C1U orientation, C1Tw orientation, and C2Tw orientation are designated by O blots, x blots, and □ blots, respectively.

As can be seen in FIG. 12, when the cell assumes the C1U orientation, a value of $\theta_M/2\theta$ when $\theta_p << \theta$ is equal merely to almost 0.5, and in other words, a value almost the half of the optical axis angle between the two states accomplished during the optimum switching operation can merely be obtained. While liquid crystals of the C1Tw orientation and C2Tw orientation in the event of $\theta_p << \theta$ are also plotted for reference, in this case, merely a value of $\theta_M/2\theta$ corresponds to almost ⅓, and it will be recognized that this is almost 35% of the optical axis angle between the two states accomplished during the optimum switching operation.

As the embodiment according to the present invention, an example where polyimide is employed with orientations of the liquid crystals 2B, 2D, 2F and 2G has been described, but other embodiments of various combinations of well-known liquid crystal materials, orientation film materials and orientation treatments can be in the scope of the present invention.

As has been described, in the liquid crystal display device according to the present invention, although it has a chevron structure, an optical axis angle between two states of liquid crystals during the switching operation can take a value almost close to the optical axis angle between the two states of the liquid crystal accomplished during the optimum switching operation, that is, it can take a value almost twice as large as a tilt angle of the liquid crystal. Thus, the switching operation which is a effective development of a feature of the liquid crystal can be implemented, and this is useful for providing a liquid crystal display device with a good contrast characteristic and for enhancing a utility of a ferroelectric liquid crystal display device. Moreover, setting a greater pre-tilt angle, an interface reversal phenomenon can be easily caused, and a switching time necessary for the interface reversal can be shortened.

What is claimed is:

1. A ferroelectric liquid crystal device comprising:
    upper and lower substrates, each being provided with electrodes on their respective surfaces, the substrates arranged with the electrode provided surfaces opposing each other
    an insulating film formed on the electrodes on each of the substrates,
    an orientation film formed on the insulating film and subjected to a uniaxial orientation treatment, the orientation film on each of the two substrates being arranged, wherein the orientation directions are the same,
    a liquid crystal composition with a chiral smectic C phase injected between the two substrates,
    drive means for switching an optical axis of the liquid crystals in the liquid crystal composition by selectively applying a voltage to the electrodes,
    means for optically identifying the switching of the optical axis, in which when the drive means is operated, the liquid crystal composition can reverse its molecular direction near the substrate and show a chevron structure which bends in a dogleg shape as a layer structure when it shows the chiral smectic C phase wherein molecules of the liquid crystal composition that are arrayed in a field between a lightning defect and a hairpin defect appear to follow the lightning defect and to oppose a direction of the uniaxial orientation treatment and wherein a pretilt angle $\theta_p$ of the liquid crystal composition to the orientation film is between 8° and 35°.

2. A device according to claim 1, wherein the pretilt angle $\theta_p$ is equal to or over a tilt angle $\theta$ of a liquid crystal composition used.

3. A device according to claim 1 or 2, wherein said orientation film is an organic polymer film.

4. A device according to claim 1, wherein the uniaxial orientation treatment for the orientation film is rubbing.

* * * * *

Adverse Decisions In Interference

Patent No. 5,347,381, Sharp Kabushiki Kaisha, FERROELECTRIC LIQUID CRYSTAL DISPLAY DEVICE WITH MOLECULES BETWEEN HAIRPIN AND LIGHTNING DEFECTS FOLLOWING THE LIGHTNING DEFECTS, Interference No. 104,097, final judgment adverse to the patentees rendered April 14, 2000, as to claims 1, 2 and 4.

*(Official Gazette June 13, 2000)*

Adverse Decisions In Interference

Patent No. 5,347,381, Sharp Kabushiki Kaisha, FERROELECTRIC LIQUID CRYSTAL DISPLAY DEVICE WITH MOLECULES BETWEEN HAIRPIN AND LIGHTNING DEFECTS FOLLOWING THE LIGHTNING DEFECTS, Interference No. 104,097, final judgment adverse to the patentees rendered April 14, 2000, as to claims 1, 2 and 4.

*(Official Gazette July 4, 2000)*

Adverse Decisions In Interference

Patent No. 5,347,381, Tokihiko Shinomiya, Tsugiko Taniguchi, Tomoaki, Kenichi Nakagawa, FERROELECTRIC LIQUID CRYSTAL DISPLAY DEVICE WITH MOLECULES BETWEEN HAIRPIN AND LIGHTNING DEFECTS FOLLOWING THE LIGHTING DEFECTS, Interference No. 104,097, final judgment adverse to the patentees rendered April 14, 2000, as to claims 1, 2 and 4.
*(Official Gazette October 10, 2000)*

REEXAMINATION CERTIFICATE (3249th)

United States Patent [19]

Shinomiya et al.

[11] B1 5,347,381
[45] Certificate Issued Jul. 1, 1997

[54] FERROELECTRIC LIQUID CRYSTAL DISPLAY DEVICE WITH MOLECULES BETWEEN HAIRPIN AND LIGHTNING DEFECTS FOLLOWING THE LIGHTNING DEFECTS

[75] Inventors: Tokihiko Shinomiya, Nara; Tsugiko Taniguchi, Kitakatsuragi; Tomoaki Kuratate, Nara; Kenichi Nakagawa, Fujinomiya, all of Japan

[73] Assignee: Sharp Kabushiki Kaisha, Osaka, Japan

Reexamination Request:
No. 90/003,956, Sep. 13, 1995

Reexamination Certificate for:
Patent No.: 5,347,381
Issued: Sep. 13, 1994
Appl. No.: 823,857
Filed: Jan. 22, 1992

[30] Foreign Application Priority Data

Jan. 25, 1991 [JP] Japan ................................. 3-007879
Jan. 31, 1991 [JP] Japan ................................. 3-032395

[51] Int. Cl.⁶ ........................ G02F 1/141; G02F 1/13
[52] U.S. Cl. ............................. 349/134; 349/172
[58] Field of Search .......................... 359/78, 100

[56] References Cited

U.S. PATENT DOCUMENTS 4,900,132  2/1990  Bos ................................. 350/346

OTHER PUBLICATIONS

Patel et al., "A Reliable Method of Alignment for Smectic Liquid Crystals" Ferroelectrics, vol. 59, pp. 137–144 (1984).
Yamamoto et al., "Ferroelectric Liquid Crystal Display with High Contrast Ratio," Japanese Journal of Applied Physics, vol. 26, No. 3, 524–29 (Mar. 1989).

*Primary Examiner*—Anita Pellman Gross

[57] ABSTRACT

A ferroelectric liquid crystal display device comprising upper and lower substrates arranged opposite each other, each provided with electrodes on their respective surface, an insulating film formed on the electrodes on each substrate, an orientation film formed on the insulating film and subjected to a uniaxial orientation treatment, the orientation film with the same orientation direction on each of the two substrates, a liquid crystal composition with a chiral smectic C phase injected between the two substrates, drive means for switching an optical axis of the liquid crystals in the liquid crystal composition by selectively applying a voltage to the electrodes, means for optically identifying the switching of the optical axis, in which when the drive means is operated, the liquid crystal composition can reverse its molecular direction near the substrate and show a chevron structure which bends in a dogleg shape as a layer structure when it shows the chiral smectic C phase wherein a bending direction of the dogleg shape is toward an inside of an area surrounded by a lightening defect produced by a direction of the uniaxial orientation treatment of the orientation film and a hairpin defect produced therebehind or an outside of an area surrounded by a hairpin defect produced by a direction of the uniaxial orientation treatment and a lightening defect produced therebehind, and a pretilt angle $\theta_p$ of the liquid crystal composition to the orientation film is between 8° and 35°.

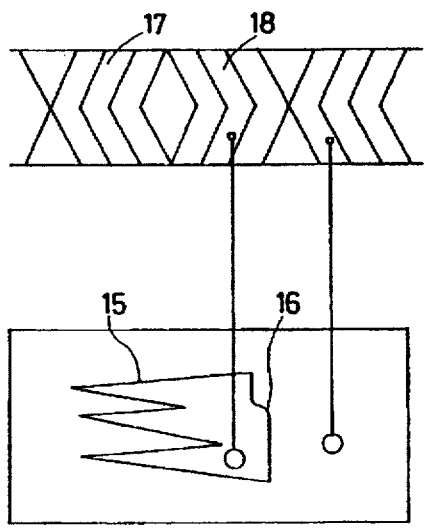

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 3 is cancelled.

Claim 1 is determined to be patentable as amended.

Claims 2 and 4, dependent on an amended claim, are determined to be patentable.

1. A ferroelectric liquid crystal device comprising:
   upper and lower substrates, each being provided with electrodes on their respective surfaces, the substrates arranged with the electrode provided surfaces opposing each other,
   an insulating film formed on the electrodes on each of the substrates,
   an orientation film *comprising an organic polymer, the film being* formed on the insulating film and subjected to a uniaxial orientation treatment, the orientation film on each of the two substrates being arranged, wherein the orientation directions are the same,
   a liquid crystal composition with a chiral smectic C phase injected between the two substrates,
   drive means for switching an optical axis of the liquid crystals in the liquid crystal composition by selectively applying a voltage to the electrodes,
   means for optically identifying the switching of the optical axis, in which when the drive means is operated, the liquid crystal composition can reverse its molecular direction near the substrate and show a chevron structure which bends in a dogleg shape as a layer structure when it shows the chiral smectic C phase wherein molecules of the liquid crystal composition that are arrayed in a field between a lightning defect and a hairpin defect appear to follow the lightning defect and to oppose a direction of the uniaxial orientation treatment and wherein a pretilt angle $\theta_p$ of the liquid crystal composition to the orientation film is [between 8°] *15° or more* and *less than* 35°
   *wherein a stable C1U orientation of 95% or more is obtained.*

* * * * *